Jan. 23, 1945.  W. B. HOLDEN  2,367,679
PRESSED METAL HANDWHEEL
Filed July 2, 1942
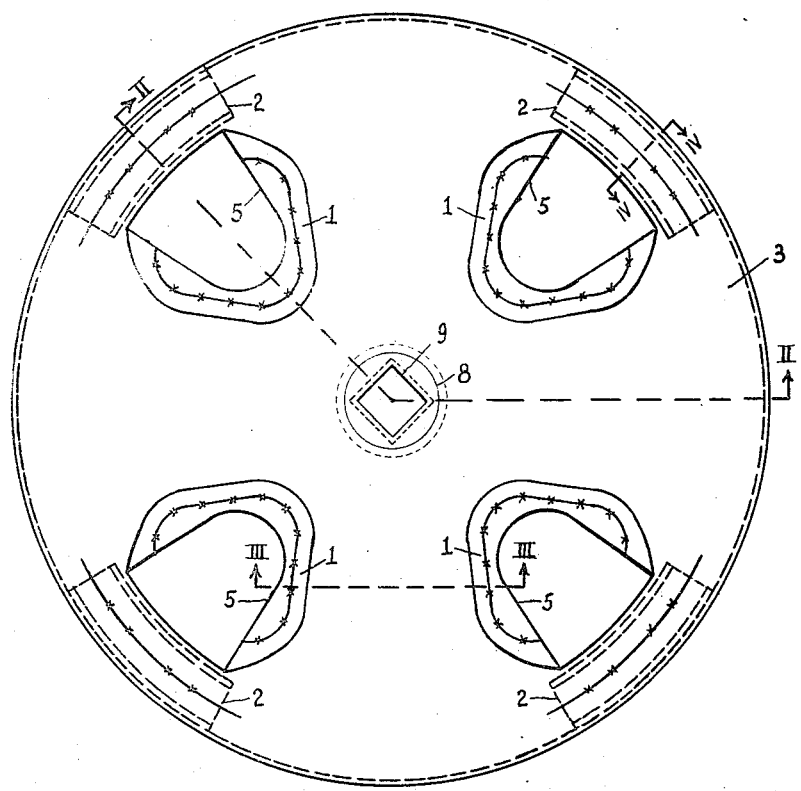
FIG. I
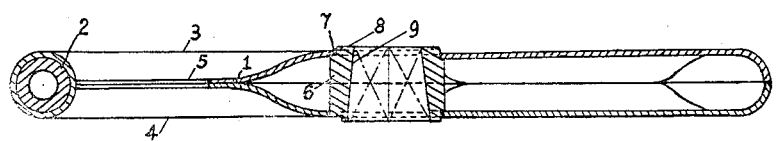
FIG. II
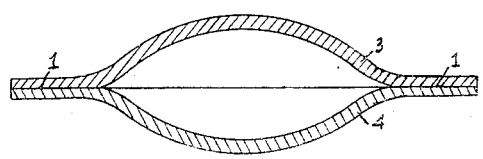
FIG. III
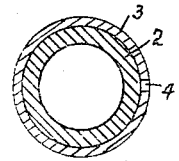
FIG. IV
William B. Holden.
INVENTOR.
BY
ATTORNEY Patented Jan. 23, 1945

2,367,679

UNITED STATES PATENT OFFICE 2,367,679

PRESSED METAL HANDWHEEL

William B. Holden, United States Navy

Application July 2, 1942, Serial No. 449,528

3 Claims. (Cl. 74—552)

(Granted under the act of March 3, 1883, as amended April 30, 1928; 370 O. G. 757)

The subject invention relates to a new and improved type of pressed metal handwheel for use principally in connection with the operation of valves, control units of various kinds, etc.

One typical example of this invention is illustrated in the accompanying drawing as a pressed metal handwheel, which depicts a practical application of the parts and combinations of the invention as set forth herein.

Fig. I is a plan view of one form of the invention,

Fig. II is a section taken through II—II of Fig. I,

Fig. III is a partial section on reduced scale taken through III—III of Fig. I, and Fig. IV is a similar section through IV—IV of Fig. I.

As indicated in the drawing the handwheel is made up of a pair of thin, matched metal disks 3 and 4 which are stamped or pressed to the contours shown, with a plurality of specially shaped matched holes or openings 5 as indicated. The contour as shown is one of many possible contours which will render the finished handwheel stiff and strong. The openings are provided to allow the use of a wrench to increase the hand force available in case the valve to which the wheel is attached is for any reason stuck. The hub 6 of the handwheel consists of a metal cylinder or other suitably shaped metal core piece recessed at 7 to fit the central holes 8 in the metal disks to provide for a suitable type of welded joint for attaching the hub to the metal disks by means of fusion welding. The central hole 9 in the hub piece is shaped to fit the spindle of the valve or other control apparatus for which the handwheel is intended.

At the outer rim of the metal disks, rim reinforcing pieces 2 may be provided as shown in the drawing. The purpose of the reinforcing pieces is to prevent the collapse of the thin metal walls when a wrench is used on the handwheel as described above. These reinforcing pieces are shown as segments made of steel tubing bent to the proper radius to register with the curvature of the stamped metal disks. Variations in the design can be made to suit individual applications involving changes in the strength and weight of the handwheel by omitting the reinforcing pieces entirely or providing a continuous reinforcing ring in lieu of the plurality of segments shown.

The pressed metal disks are attached together at the depressed areas 1 adjacent to the holes 5 in the disks by use of spot welding. The reinforcing segments at the rim of the handwheel are likewise attached to the disks by spot welding. It will be understood that this method of attachment constitutes only one of a large variety of suitable methods for joining the various parts of the pressed metal handwheel. It will be noted that in the case illustrated in the drawing the disks are not attached at their outer periphery. It is believed desirable that the two disks be suitably joined by fusion welding at their outer periphery in order to prevent internal corrosion in the case of steel wheels and to present a smoother surface to the hands of the operator.

It will be understood that, although in common use the pressed metal handwheel will be made of steel, it can be made of non-ferrous materials such as Monel, copper, brass, etc, to resist corrosion, and certain suitable plastics may be employed in its construction to great advantage for use in connection with electrical control apparatus and other special applications.

The many important advantages of the new type of handwheel described herein over devices for the same purpose used heretofore are readily apparent.

This development is particularly important and timely in view of the current necessity for conservation of critical materials. Valve handwheels for naval vessels have been generally made of cast aluminum because of the necessity of providing equipment of minimum weight. It has become necessary to abandon the use of aluminum for this purpose to provide for accelerated aircraft production associated with prosecution of the war. The Navy was thus faced with the serious excess weight of naval machinery which would have to be accepted if commercially standard cast steel or malleable iron handwheels were employed to replace aluminum handwheels. The recent invention and adoption of the type of pressed metal handwheel disclosed herein will avoid the threatened excess machinery weight associated with the necessity for eliminating the use of aluminum for handwheels as the pressed metal handwheel weighs about the same as the aluminum handwheel, which it replaces. Even ferrous metals are becoming scarce for non-essential uses, and in view of the great saving of weight over cast metal handwheels of other types, the employment of pressed steel handwheels effects important savings in the necessary use of steel for essential machinery construction.

Another important advantage of the pressed metal handwheel over aluminum handwheels and most commercial handwheels made of cast iron or malleable iron is found in the appreciably greater strength of the pressed metal handwheel and its inherent resistance to damage due to shock. Commercial cast iron handwheels are entirely unsuitable for use aboard naval vessels as they are subject to complete disintegration under the severe shocks imposed by underwater attack, shell hits, bombing, and shell and bomb fragments from direct hits or near misses. Thus the new pressed metal handwheel possesses the fundamental advantages associated with maximum strength and minimum weight.

A further advantage of the pressed metal handwheel is found in the easy and economical construction obtained in production processes. A minimum of machine work is involved in its manufacture.

The dies constructed for forming the pressed metal disks may be employed for the production of literally thousands of the disks at maximum production rate. Assembly of the various parts is accomplished with great facility and minimum time is consumed. The nation's casting facilities, particularly the steel casting facilities, are at present greatly over-loaded with important work associated with the maximum war effort and the use of pressed metal handwheels to replace cast metal handwheels makes available additional casting facilities for production of equipment which cannot be divorced from cast metal parts.

The development of pressed steel handwheels is considered highly important, particularly for use aboard naval vessels.

As previously mentioned the illustrated handwheel is only one typical example of the invention which also contemplates irregular shapes of handwheel, such as polygonal, scalloped, fingergrip rim form, etc. Likewise the cutout portions spaced around the center may be entirely omitted or may be larger or of different configuration. The reinforcing rim segments or rings may be solid instead of tubular. The disks may not be joined around the entire periphery as shown, the hub may be formed with a male fitting to be applied to a socket, instead of a female fitting as illustrated. The cut-out portions in the center of the discs and the corresponding shoulders on the hub may be other than circular in shape. Many modifications in shape and materials may be made within the scope of the present invention as defined by the appended claims.

The invention described herein, if patented, may be manufactured and used by or for the Government for governmental purposes without the payment to me of any royalty thereon.

What I claim is:

1. A handwheel composed of two complementary flat circular stampings of metal or other suitable material spaced from each other and joined at the center by a hub, comparatively small areas of the stampings near the periphery being cut-out, the peripheral edges of the stampings being turned toward each other and joined together, curved rim-reenforcing tubular sections being inserted inside the said peripheral edges opposite the cut-out openings, the outer edges of the cut-out openings being turned in toward each other over the inward side of said tubular sections and joined together, the remaining edge portions around the cut-out openings in each stamping being drawn toward the corresponding edge portions in the other stamping where the stampings are joined together over flattened areas around said openings.

2. A handwheel composed of two discs spaced from each other except at the periphery where their edges are curved over to meet each other, and at complementary openings spaced around the discs close to the periphery, the juncture at said openings being made by drawing the portions of the discs adjacent the openings flat against each other to form an extended surface joint, except on the outer side of the openings where the edges are merely curved over to meet each other, and a hub member joining the discs at their centers.

3. A handwheel composed of two discs spaced from each other except at the periphery where their edges are curved over to meet each other, and at complementary openings spaced around the discs close to the periphery, the juncture at said openings being made by drawing the portions of the discs adjacent the openings flat against each other to form an extended surface joint, except on the outer side of the openings where the edges are merely curved over to meet each other, reenforcing tubular sections snugly fitted in the rim of said wheel between the periphery and the openings, and a hub member joining the discs at their centers.

WILLIAM B. HOLDEN.